United States Patent
Jung et al.

(10) Patent No.: US 8,649,691 B2
(45) Date of Patent: Feb. 11, 2014

(54) APPARATUS AND METHOD FOR DETECTING OPTICAL SIGNALS

(75) Inventors: Eui-suk Jung, Daejeon-si (KR);
Dong-min Seol, Daejeon-si (KR);
Byoung-whi Kim, Daejeon-si (KR);
Sang-soo Lee, Daejeon-si (KR);
Seung-hyun Cho, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 588 days.

(21) Appl. No.: 12/687,246

(22) Filed: Jan. 14, 2010

(65) Prior Publication Data

US 2011/0044691 A1 Feb. 24, 2011

(30) Foreign Application Priority Data

Aug. 18, 2009 (KR) .................. 10-2009-0076416

(51) Int. Cl.
*H04B 10/06* (2011.01)
(52) U.S. Cl.
USPC .......................................... 398/210; 398/208
(58) Field of Classification Search
USPC ................................................ 398/202–214
See application file for complete search history.

(56) References Cited

U.S. PATENT DOCUMENTS

2002/0196510 A1 12/2002 Hietala et al.
2006/0136798 A1* 6/2006 Domagala et al. ............ 714/752
2007/0206964 A1* 9/2007 Lee et al. .................... 398/208
2008/0002985 A1* 1/2008 Shang et al. .................. 398/141
2009/0269081 A1* 10/2009 Cai et al. ...................... 398/202

FOREIGN PATENT DOCUMENTS

KR 1020070021739 A 2/2007

OTHER PUBLICATIONS

Y. Matsumoto, et al; "An adaptive decision threshold control of the optical receiver for multi-gigabit terrestrial DWDM transmission systems" Optical Fiber Communication Conference and Exhibit, 2001. vol. 2, Issue, 200 (exact date not given) 1, pp. TuR2-1-TuR2-3.
Sil-Gu Mun, et al; "An optimization method for the decision threshold level in optical receivers for WDM-PONs", Network Architectures, Management, and Aplications IV, Proc. Of SPIE, vol. 6354, pp. 635429-1-635429-7 (2006 exact date not given).

* cited by examiner

*Primary Examiner* — Dzung Tran
(74) *Attorney, Agent, or Firm* — Ladas & Parry LLP

(57) ABSTRACT

Disclosed are an apparatus and method for detecting optical signals. The optical signal detection apparatus includes: a signal receiver to convert a received optical signal into an electrical signal; a threshold decision unit to establish a mathematical model based on the electrical signal and to decide an optimized threshold value based on the mathematical model; and a signal detector to detect the electrical signal based on the optimized threshold value. Hence, since threshold values optimized adaptively according to received signals are used, a bit error rate may be lowered and accordingly detection performance may be improved.

13 Claims, 3 Drawing Sheets

APPARATUS AND METHOD FOR DETECTING OPTICAL SIGNALS

CROSS-REFERENCE TO RELATED APPLICATION

This application claims the benefit under 35 U.S.C. §119(a) of Korean Patent Application No. 10-2009-76416, filed on Aug. 18, 2009, the disclosure of which is incorporated by reference in its entirety for all purposes.

BACKGROUND

1. Field

The following description relates to detection of optical signals, and more particularly, to an apparatus and method for detecting remodulated On-Off Keying (OOK) signals.

2. Description of the Related Art

On-Off Keying (OOK) is used to convert binary signals into signals with specific amplitudes for communications. OOK signals have been widely used for optical communications and applied to general digital devices as they have simple waveshapes and are easy to intuitively understand.

A Wavelength-Division-Multiplexed Passive Optical Network (WDM-PON) uses, as a light source, a Reflective Semiconductor Optical Amplifier (RSOA) or a SOA-REAM (Reflective Electro-Absorption Modulator). When an RSOA is installed in a subscriber side, the RSOA amplifies and remodulates OOK signals. At this time, the amplitude of a remodulated signal "1" depends on whether a signal received by the subscriber side has a level of "0" or "1".

A general method of detecting OOK signals is based on a mathematical model. In detail, a mathematical model is established using the amount of noise existing in a "0"-level signal, the amount of noise existing in a "1"-level signal and the amplitude of the signal. Then, based on the mathematical model, a proper threshold value is decided or maximum likelihood detection is performed. However, as described above, since a remodulated OOK signal "1" is dependent on the amplitude of its original signal before remodulation, applying an existing mathematical model to detect OOK signals fails to obtain optimum performance.

Also, a device which uses a fixed threshold in detecting OOK signals has difficulty in setting the threshold to an optimized value. Furthermore, in the case of a Time Division Multiplexing (TDM) network where signals vary over time, the detection based on a fixed threshold is limited in terms of performance.

SUMMARY

The following description relates to an adaptive detection apparatus and method optimized to detect On-Off Keying (OOK) signals remodulated from downlink signals.

According to an exemplary aspect, there is provided an optical signal detection apparatus including: a signal receiver to convert an remodulated On-Off Keying (OOK) signal into an electrical signal; a threshold decision unit to establish a mathematical model based on the electrical signal and decide an optimized threshold value based on the mathematical model; and a signal detector to detect the electrical signal based on the optimized threshold value.

According to another exemplary aspect, there is provided an optical signal detection method including: converting an remodulated On-Off Keying (OOK) signal into an electrical signal; establishing a mathematical model based on the electrical signal and deciding an optimized threshold value based on the mathematical model; and detecting the electrical signal based on the optimized threshold value.

Therefore, threshold values may be calculated to be able to optimize the performance of remodulated OOK signals. As such, since threshold values optimized adaptively according to received signals are used, a bit error rate may be lowered and accordingly detection performance may be improved. In addition, threshold values may be set automatically to be optimized respectively for individual receivers that are located at different positions. Furthermore, various parameters obtained during calculating a threshold value may be applied to monitor network performance as well as the performance of transmission signals.

Other objects, features and advantages will be apparent from the following description, the drawings, and the claims.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

Figure 1:
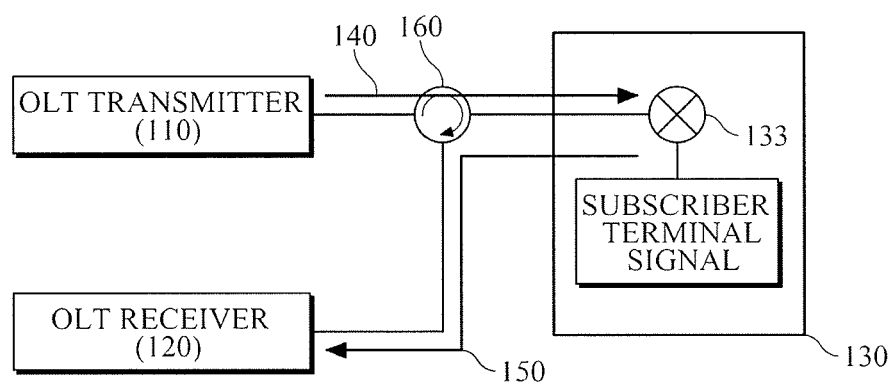
FIG. 1 is a block diagram for explaining an example of generating remodulated On-Off Keying (OOK) signals.

FIG. 1 is a block diagram for explaining an example of generating remodulated On-Off Keying (OOK) signals.

FIG. 1 shows an example where a remodulated OOK signal is created in a Wavelength-Division-Multiplexed Passive Optical Network (WDM-PON). Referring to FIG. 1, first, an Optical Line Terminal (OLT) transmitter 110 transmits a downlink signal 140 modulated through OOK to a subscriber transceiver 130. The downlink signal 140 received by the subscriber transceiver 130 is transferred to an uplink signal transmitter 133. The uplink signal transmitter 133 includes a Reflective Semiconductor Optical Amplifier (RSOA) or a SOA-REAM (Reflective Electro-Absorption Modulator). The uplink signal transmitter 133 may obtain an RSOA optical output modulated to an uplink signal 150 by applying current differentiated for the uplink signal 150 to the RSOA, that is, by performing direct modulation. When a signal having the same wavelength as the downlink signal 140 is converted into an uplink signal 150, the uplink signal 150 is generated as a remodulated OOK signal. The remodulated OOK signal 150 is transmitted to an OLT receiver 120 via a circulator. If the remodulated OOK signal 150 has a "1" level, its downlink signal 140 has a level of either "1" or "0". This is because there is the case where a downlink signal 140 of "0" level is modulated to an uplink signal 150 of "1" level. In other words, an uplink signal of "1" level is determined to include two cases of (downlink: "1", uplink: "1") and (downlink: "0", uplink: "1").

Figure 2:
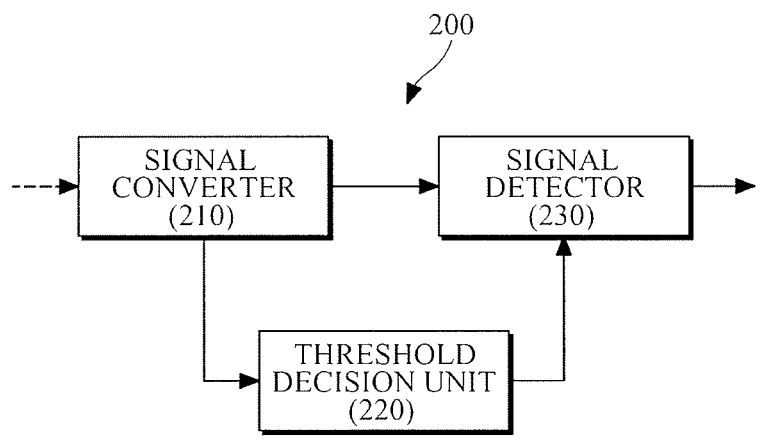
FIG. 2 is a block diagram illustrating an optical signal detection apparatus according to an exemplary embodiment.

FIG. 2 is a block diagram illustrating an optical signal detection apparatus 200 according to an exemplary embodiment.

Referring to FIG. 2, the optical signal detection apparatus 200 includes a signal converter 210, a threshold decision unit 220 and a signal detector 230. The signal converter 210 converts an optical signal into an electrical signal. The signal converter 210 may receive a remodulated OOK signal. The signal converter 210 may include a light detector such as a photodiode to convert light energy into an electrical signal. The converted electrical signal is transferred to the threshold decision unit 220 and a signal detector 230.

The threshold decision unit 220 receives the electrical signal and establishes a mathematical model based on the electrical signal, thus deciding an optimized threshold value.

Figure 3:
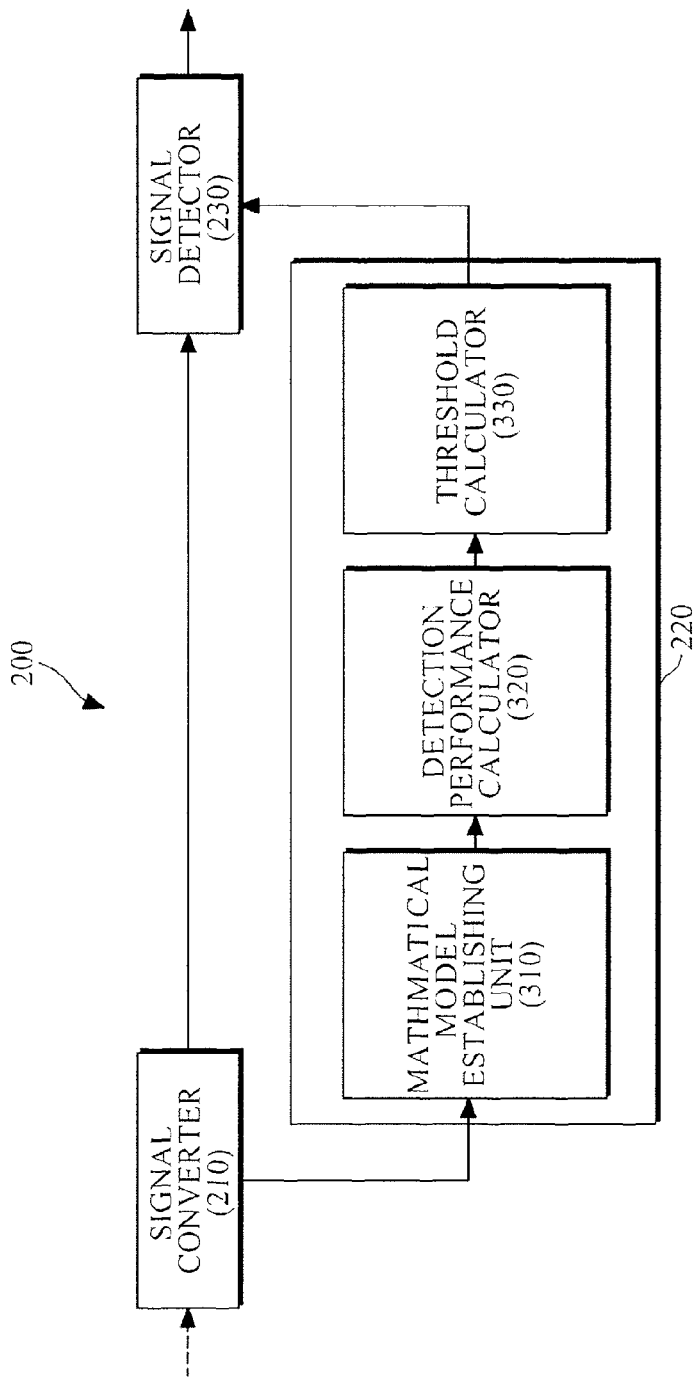
FIG. 3 is a block diagram showing a configuration of a threshold decision unit according to an exemplary embodiment.

FIG. 3 is a block diagram showing a configuration of the threshold decision unit 220 according to an exemplary embodiment.

Referring to FIG. 3, the threshold decision unit 220 includes a mathematical model establishing unit 310, a detection performance calculator 320 and a threshold calculator 330.

The mathematical model establishing unit 310 establishes a mathematical model based on electrical signals received during a predetermined time period, including the converted electrical signal. Here, the length of the predetermined time period is set to a length at which detection performance can be optimized. According to an exemplary embodiment, a mathematical model of the remodulated OOK signal can be expressed as a probability distribution function by Equation 1.

$f_x(x)$=(Probability Distribution Function for "0" Level Uplink Signal)+(Probability Distribution Function for "1" Level Uplink Signal Remodulated from "0" Level Downlink Signal)+(Probability Distribution Function For "1" Level Uplink Signal Remodulated from "1" Level Downlink Signal) (1)

It can be seen in Equation 1 that a mathematical model of the remodulated OOK signal is represented as a sum of probability distribution functions for three cases. Information about the original downlink signal of the remodulated OOK signal may be acquired from the OLT transmitter 110.

According to another exemplary embodiment, a probability distribution function for the remodulated OOK signal may follow a normal distribution function. In this case, the probability distribution function for the remodulated OOK signal can be expressed as Equation 2.

$$f_X(x) = \frac{1}{2}\left(\frac{1}{\sigma_0\sqrt{2\pi}}\exp\left[-\frac{(x-\mu_0)^2}{\sigma_0^2}\right]\right) + \frac{1}{4}\left(\frac{1}{\sigma_{10}\sqrt{2\pi}}\exp\left[-\frac{(x-\mu_{10})^2}{\sigma_{10}^2}\right]\right) + \frac{1}{4}\left(\frac{1}{\sigma_{11}\sqrt{2\pi}}\exp\left[-\frac{(x-\mu_{11})^2}{\sigma_{11}^2}\right]\right),$$ (2)

where the first term of the right side is a probability distribution function for a "0" level uplink signal, the second term is a probability distribution function for a "1" level uplink signal remodulated from a "0" level downlink signal, and the third term is a probability distribution function for a "1" level uplink signal remodulated from a "1" level downlink signal.

Each term of the right side is assigned a weight depending on a generation probability of the corresponding signal. In Equation 2, $\mu_0$ represents an expectation value for "0" level that is calculated based on electrical signals collected for a predetermined time period (hereinafter, referred to as an "A" period), including the converted electrical signal, and $\sigma_0$ represents a standard deviation for "0" level that is calculated based on the electrical signals collected for the "A" period. Likewise, $\mu_{10}$ represents an expectation value for an "1" level uplink signal remodulated from a "0" level downlink signal, which is also calculated based on the electrical signals collected for the "A" period, and $\mu_{11}$ represents a standard deviation for the "1" level uplink signal remodulated from the "0" level downlink signal, which is also calculated based on the electrical signals collected for the "A" period. Also, $\mu_{11}$ represents an expectation value for an "1" level uplink signal remodulated from a "1" level downlink signal, which is calculated based on the electrical signals collected for the "A" period, and $\sigma_{11}$ represents a standard deviation for the "1" level uplink signal remodulated from the "1" level downlink signal, which is likewise calculated based on the electrical signals collected for the "A" period.

The detection performance calculator 320 calculates detection performance based on the mathematical model. According to an exemplary embodiment, the detection performance may be estimated by a bit error rate (BER). The detection performance Pe (BER) may be obtained by setting a threshold value $A_{th}$ and then detecting and counting function values (that is, the amount of errors) exceeding the $A_{th}$ value when transmitting a "0" level signal and function values (the amount of errors) not reaching the $A_{th}$ value when transmitting a "1" level signal. Detection performance Pe (BER) based on a threshold value $A_{th}$ can be calculated using Equation 3, below.

$$P_e = \frac{1}{4\sqrt{\pi}}\left(2\int_{\frac{A_{th}-\mu_0}{\sigma_0\sqrt{2}}}^{\infty} e^{-z^2}dz + \int_{-\infty}^{\frac{\mu_{10}-A_{th}}{\sigma_{10}\sqrt{2}}} e^{-z^2}dz + \int_{-\infty}^{\frac{\mu_{11}-A_{th}}{\sigma_{11}\sqrt{2}}} e^{-z^2}dz\right)$$ (3)

$$Z = \frac{x-\mu_0}{\sigma_0}$$

The threshold calculator 330 calculates a threshold value optimized to maximize detection performance, based on the calculated detection performance. According to an exemplary embodiment, the optimized threshold value may be a value to minimize a bit error rate (BER). An Equation for calculating an optimized threshold value can be expressed as follows.

$$2\exp\left[-\frac{(A_{th\_opt}-\mu_0)^2}{2\sigma_0^2}\right] = \exp\left[-\frac{(\mu_{11}-A_{th\_opt})^2}{2\sigma_{11}^2}\right] + \exp\left[-\frac{(\mu_{10}-A_{th\_opt})^2}{2\sigma_{10}^2}\right]$$ (4)

Equation 4 is derived by differentiating Equation 3 with respect to $A_{th}$ and then rewriting it. By rewriting Equation 4 with respect to $A_{th\_opt}$, an optimized threshold value $A_{th\_opt}$ is obtained. Consequently, by determining a signal level to be "1" or "0" depending on whether or not the signal level exceeds the $A_{th\_opt}$ value, the performance of the signal can be optimized.

The signal detector 230 detects the electrical signal received from the signal converter 210 by comparing the electrical signal to the optimized threshold value. The signal detector 230 may be a Limiting Amplifier (LA) or a simple detection circuit. The signal detector 230 may determine the electrical signal to be "0" when it is smaller than the $A_{th\_opt}$ value, and determine the electrical signal to be "1" when it is greater than the $A_{th\_opt}$ value.

Figure 4:
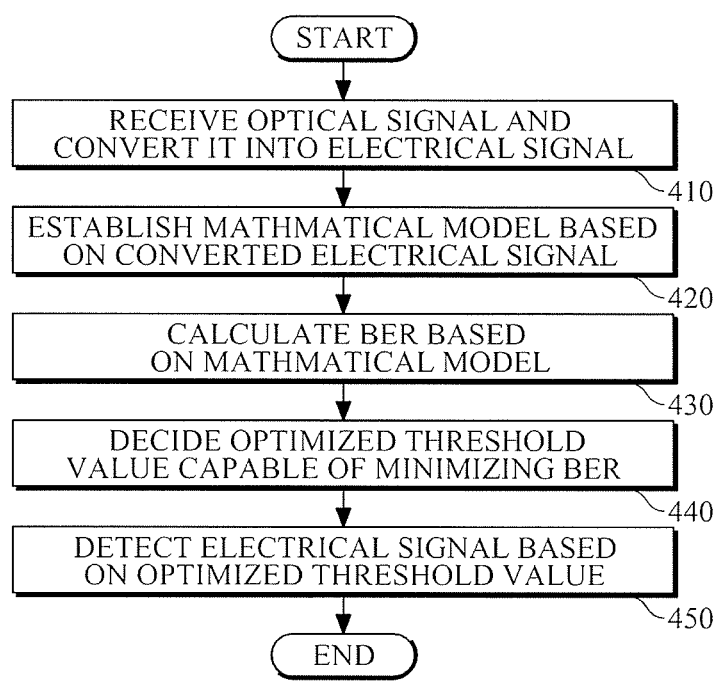
FIG. 4 is a flowchart of a signal detection method according to an exemplary embodiment.

FIG. 4 is a flowchart of a signal detection method according to an exemplary embodiment.

Referring to FIGS. 2, 3 and 4, the signal converter 210 receives an optical signal and converts it into an electrical signal (operation 410). The electrical signal is transferred to the threshold decision unit 220 and the signal detector 230. The threshold decision unit 220 collects electrical signals for a predetermined time period, including the converted electrical signal, and then establishes a mathematical model based on the collected electrical signals (operation 420). According to an exemplary embodiment, the mathematical model is a sum of a probability distribution function for a "0" level uplink signal, a probability distribution function for a "1" level uplink signal remodulated from a "0" level downlink signal, and a probability distribution function for a "1" level uplink signal remodulated from a "1" level downlink signal. Here, each probability distribution function follows a normal distribution. An expectation value and standard deviation of each probability distribution function which follows a normal distribution are calculated based on the converted electrical signal. According to an exemplary embodiment, the expectation value and standard deviation of each probability distribution function may be calculated based on electrical signals collected for a predetermined time period, including the converted electrical signal. The length of the predetermined time period is set as a length at which detection performance is optimized. Information about the original downlink signal before the remodulation may be acquired from the OLT transmitter 110. After the mathematical model is established, detection performance is calculated based on the mathematical model. According to an exemplary embodiment, a BER is calculated based on the mathematical model (operation 430). The detection performance Pe (BER) may be obtained by setting a threshold value $A_{th}$ and then detecting and counting function values (that is, the amount of errors) exceeding the $A_{th}$ value when transmitting a "0" level signal and function values (the amount of errors) not reaching the $A_{th}$ value when transmitting a "1" level signal. Accordingly, by integrating a corresponding section in a probability distribution function, a BER can be calculated. Then, an optimized threshold value is decided using the BER (operation 440). According to an exemplary embodiment, the optimized threshold value may be a value to minimize the BER. Then, the signal detector 230 detects the electrical signal by comparing the electrical signal to the optimized threshold value (operation 450). The electrical signal is determined to be "0" if it is smaller than the optimized threshold value, and to be "1" if it is greater than the optimized threshold value.

It will be apparent to those of ordinary skill in the art that various modifications can be made to the exemplary embodiments of the invention described above. However, as long as modifications fall within the scope of the appended claims and their equivalents, they should not be misconstrued as a departure from the scope of the invention itself.

What is claimed is:

1. An optical signal detection apparatus comprising:
    a signal receiver to convert a remodulated On-Off Keying (OOK) signal into an electrical signal;
    a threshold decision unit that collects from the electrical signal first signal values representing a 0 level and second signal values representing a 1 level and establishes a mathematical model based on the electrical signal and the first and second collected signal values, and decides an optimized threshold value based on the mathematical model; and
    a signal detector to detect the electrical signal based on the optimized threshold value.

2. The optical signal detection apparatus of claim 1, wherein the threshold decision unit comprises:
    a mathematical model establishing unit to establish the mathematical model based on the converted electrical signal for a predetermined time period;
    a detection performance calculator to calculate detection performance based on the mathematical model; and
    a threshold calculator to calculate an optimized threshold value capable of maximizing detection performance, based on the calculated detection performance.

3. The optical signal detection apparatus of claim 2, wherein the detection performance calculator calculates the detection performance based on a bit error rate (BER).

4. The optical signal detection apparatus of claim 3, wherein the threshold calculator decides as the optimized threshold value a value at which the BER is minimized.

5. The optical signal detection apparatus of claim 1, wherein the mathematical model establishing unit establishes a probability distribution function based on the converted electrical signal.

6. The optical signal detection apparatus of claim 5, wherein the probability distribution function is a normal distribution function.

7. The optical signal detection apparatus of claim 1 applied to a Wavelength-Division-Multiplexed Passive Optical Network (WDM-PON) system.

8. An optical signal detection method comprising:
    converting a remodulated On-Off Keying (OOK) signal into an electrical signal;
    collecting from the electrical signal first signal values representing a 0 level and second signal values representing a 1 level;
    establishing a mathematical model based on the electrical signal and the first and second collected signal values, and deciding an optimized threshold value based on the mathematical model; and
    detecting the electrical signal based on the optimized threshold value.

9. The optical signal detection method of claim 8, wherein the deciding of the optimized threshold value comprises:
    establishing the mathematical model based on the converted electrical signal for a predetermined time period;
    calculating detection performance based on the mathematical model; and
    calculating an optimized threshold value capable of maximizing detection performance, based on the calculated detection performance.

10. The optical signal detection method of claim 9, wherein the detection performance is calculated based on a bit error rate (BER).

11. The optical signal detection method of claim 10, wherein the optimized threshold value is decided as a value at which the BER is minimized.

12. The optical signal detection method of claim 8, wherein the mathematical model is a probability distribution function.

13. The optical signal detection method of claim 12, wherein the probability distribution function is a normal distribution function.

* * * * *